(12) United States Patent
Kudelski et al.

(10) Patent No.: US 7,577,846 B2
(45) Date of Patent: Aug. 18, 2009

(54) MECHANISM OF MATCHING BETWEEN A RECEIVER AND A SECURITY MODULE

(75) Inventors: André Kudelski, Lutry (CH); Marco Sasselli, Chardonne (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 466 days.

(21) Appl. No.: 10/165,915

(22) Filed: Jun. 10, 2002

(65) Prior Publication Data
US 2002/0170054 A1 Nov. 14, 2002

Related U.S. Application Data

(63) Continuation-in-part of application No. 09/647,751, filed on Oct. 4, 2000, now abandoned.

(51) Int. Cl.
*G06F 21/00* (2006.01)
*H04N 7/167* (2006.01)

(52) U.S. Cl. .................. 713/185; 713/189; 380/241; 725/31

(58) Field of Classification Search .............. None
See application file for complete search history.

(56) References Cited

U.S. PATENT DOCUMENTS

| | | | |
|---|---|---|---|
| 4,807,286 A | 2/1989 | Wiedemer | |
| 5,029,207 A | 7/1991 | Gammie | |
| 5,426,701 A * | 6/1995 | Herrmann et al. | 380/52 |
| 5,539,828 A * | 7/1996 | Davis | 713/173 |
| 5,563,948 A * | 10/1996 | Diehl et al. | 380/229 |
| 5,748,732 A | 5/1998 | Le Berre et al. | |
| 6,061,451 A * | 5/2000 | Muratani et al. | 380/201 |
| 6,170,060 B1 * | 1/2001 | Mott et al. | 726/29 |
| 6,266,415 B1 * | 7/2001 | Campinos et al. | 380/247 |
| 6,286,103 B1 * | 9/2001 | Maillard et al. | 726/26 |
| 6,577,734 B1 * | 6/2003 | Etzel et al. | 380/277 |
| 6,668,320 B1 * | 12/2003 | Van Rijnsoever | 713/151 |
| 7,409,562 B2 * | 8/2008 | Kahn et al. | 713/194 |
| 2004/0017918 A1 * | 1/2004 | Nicolas | 380/279 |
| 2008/0095365 A1 * | 4/2008 | Cocchi et al. | 380/228 |

FOREIGN PATENT DOCUMENTS

WO WO 97/38530 A1 10/1997

OTHER PUBLICATIONS

Foreign Search Report issued on Sep. 23, 2005.

* cited by examiner

*Primary Examiner*—Christopher A Revak
(74) *Attorney, Agent, or Firm*—Harness, Dickey & Pierce, P.L.C.

(57) ABSTRACT

System for controlling the transmission of information between a receiver and a security module, especially for a pay television system, in which the transmitted information is encrypted and decrypted by means of a unique encryption key stored, on the one hand, in the receiver and, on the other hand, in the security module.

38 Claims, 1 Drawing Sheet

MECHANISM OF MATCHING BETWEEN A RECEIVER AND A SECURITY MODULE

Continuation-in-Part Application of U.S. patent application Ser. No. 09/647,751 Filed Oct. 4, 2000, now abandoned

TECHNICAL FIELD

This invention relates to a system for controlling the transfer of information between a receiver and a security module, especially for a pay television system, as well as to a method of controlling the transfer of scrambled information.

BACKGROUND OF THE INVENTION

A pay television descrambling system is composed of a receiver and a security module. This module may be detachable or fixed. The purpose of the receiver is to descramble the signals received. The main purpose of the security module is to control the operation by verifying the descrambling authorization and by providing, as required, the information necessary for operating the descrambling module, for example by providing descrambling vectors, also called control words.

The existing systems use receivers which interrogate their security. modules, and the latter reply by providing the information necessary for descrambling. At a given time, for the same transmitted broadcast, all the security modules reply with the same information. Because the information flows between the security module and the receiver at a low rate (of about 20 to 30 bytes/s), defrauders may use this information in order to broadcast it publicly, for example via the Internet.

Such a system is described in the document "DVD Conditional Access" written by David Cutts in the journal called "Electronics & Communication Engineering Journal" of February 1997. It is described a standardized system to unscramble audio and video streams coming from different service providers. The security module, called CA (Conditional Access) is in charge of delivering the control words CW. This module can additionally uses a smart card (SM) for the descrambling function. Once the information are descrambled in the CA module, the control words CW are returned in the decoder for obtaining the uncoded information.

In a prior publication entitled "Conditional Access Broadcasting:Datacare 2, an Over-Air Enabled System for General Purpose Data Channels", published on Aug. 1, 1988 in the journal BBC Research and Development Report No 10, it is described an independent module (Conditional Access Module) in charge of receiving and decrypting the information necessary for the descrambling. This module manages the key dedicated to the system and delivers the control words necessary for the descrambling of the video broadcasts. In this type of module, once the control words are decrypted, they are transmitted uncoded to the unit in charge of the descrambling.

The problem then arises of how to make a receiver and a security module interdependent so that:

the given security module can be used only in the receiver for which the said security module was intended;

the information stream exchanged between the security module and the receiver is unique. This uniqueness prevents the public broadcasting of this stream from allowing other receivers to work without the security module provided for this purpose.

SUMMARY OF THE INVENTION

The proposed solution to the above mentioned problem uses at least one encryption key specific to the receiver. This (or these) key(s) is(are) called a matching key. At least one of the keys is different for each receiver. This (or these) key(s) is(are) installed in the non-volatile memory of the receiver, either during the manufacture of the said receiver or at a subsequent step. The receiver provides no means of access to this (or these) key(s) to the external world.

One possible means of programming this key into the security module is to use the central information system which manages the group of receivers and which can embed, in the video transmission stream, information for programming this key into the secret non-volatile memory of the security modules. The formatting of this procedure is, of course, kept secret.

When transferring confidential information and/or information necessary for the operation of the system from the security module to the receiver (typically, control words, but other information may be thus transferred), the security module encrypts this information using one or more unique matching keys common to the single receiver/security module pair. Any method of encryption can be used provided the security module knows it, and the receiver knows the corresponding method of decryption. Once this information has been received by the receiver, it is then decrypted by the said receiver using the known method of decryption and the matching key stored in its non-volatile memory. The said information is then uncoded information and can be used by the said receiver.

The invention therefore proposes a system for controlling the transmission of information between a receiver and a security module, especially for a pay television system, in which the transmitted information is encrypted and decrypted by means of at least one unique encryption key stored, on the one hand, in the receiver and, on the other hand, in the security module.

The invention also relates to a system for descrambling scrambled information and to a pay television system comprising a transmission control system.

Moreover, the invention relates to a method of controlling the transmission of information between a receiver and a security module, especially for a pay television system, characterized in that at least one unique matching key is stored, on the one hand, in the receiver and, on the other hand, in the security module and in that the information transmitted between the receiver and the security module is encrypted and decrypted by means of at least one said unique encryption key.

This solution according to the invention solves the problem posed. This is because:

a security module inserted into a receiver other than that for which the said security module has been matched will provide this other receiver with a stream of confidential information and/or of information necessary for the operation of the system which is encrypted with a key that does not correspond to that used for decrypting it. The result is therefore unusable;

a stream of confidential information and/or of information necessary for the operation of the system coming from a security module cannot be distributed to several receivers. Only the receiver matched with the card providing this stream of confidential and/or necessary information is able to decrypt the said stream successfully.

The system may comprise a mechanism for verifying the matching procedure. The central information system may write a number, personal to the receiver, in the security module matched with the said receiver, for example a number generated randomly by the latter, or may simply use its serial number. One means open to the receiver is to freely verify this personal number written in the security module and to compare it with that stored in its non-volatile memory. This mechanism has the advantage of not using improper data. The result of encryption followed by decryption by a different key usually provides a pseudo-random result. If the result is not recognized as being false and if this result is used as it is, this could result in the receiver or the equipment connected to it being damaged.

Certain types of receivers have a detachable descrambling module. This module is responsible for a number of operations, among which is the operation of descrambling the signals received. Confidential information is then transferred between the detachable security module and this detachable descrambling module. The mechanism of encryption of the communication, described above, between a receiver and a security module is then transferred, as it is, between the detachable security module and the detachable descrambling module.

Likewise, the method of matching, described above, between the security module and the receiver is then transferred, as it is, between the detachable security module and the detachable descrambling module.

Descrambled signals are then transferred between the detachable descrambling module and the receiver. The mechanism of encrypting the communication, along with the mechanism of matching, described above, between the security module and the receiver, is then transferred, as it is, between the receiver and the detachable descrambling module.

The functions provided by the detachable descrambling module and the detachable security module may be carried out by a single module, called a detachable descrambling-security module. The matching mechanism described above is then transferred, as it is, between the detachable descrambling-security module and the receiver.

In all the cases described above, the matching key or keys may be used to encrypt a stream of confidential data and/or of data necessary for operating the system in the opposite direction, by reversing, respectively:

the receiver and the detachable security module;
the detachable descrambling module and the detachable security module;
the receiver and the detachable descrambling module;
the receiver and the detachable descrambling-security module.

In all cases where a matching key is specific to one item of equipment (a receiver or a detachable module), the same principles apply to the use of a matching key (or several matching keys) specific to a group of items of equipment.

It is known that it exists two families of encryption algorithms, i.e., the symmetric and the asymmetric encryption.

In the first case, the unique symmetric key is stored in the receiver and in the security module.

In the second case, the private key is stored in the security module and the public key is stored in the receiver. The data sent from the security means are encrypted with the private key and similarly, the data sent from the receiver to the security means are encrypted with the public key.

DETAILED DESCRIPTION

Figure 1:
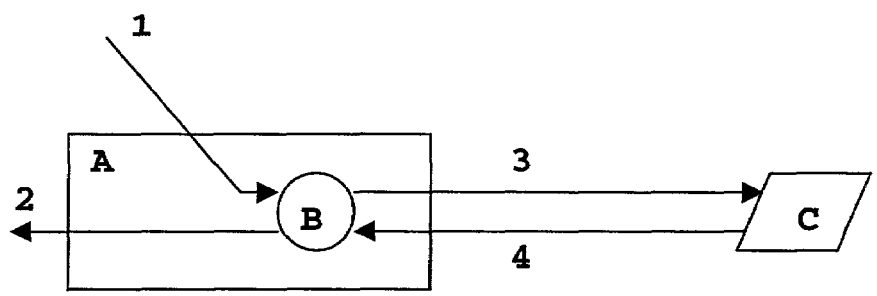
FIG. 1 illustrates a configuration employing a receiver and a detachable security module.

The receiver A in FIG. 1 receives a stream of scrambled video information 1 from a source such as a satellite receiver or by cable. This stream, of the order of several megabits per second, is shaped in the receiver A and then transmitted to a control unit B which is responsible for the descrambling and for managing the authorization for access to the scrambled video information. To do this, this control unit B periodically interrogates the detachable security module C (channel 3) which replies to the latter with a stream of confidential data and/or of data necessary for the operation of the control unit B (channel 4). These exchanges take place at low rates and can be easily processed by the microprocessors of smart cards available on the market. According to the invention, the detachable security module C comprises at least one encryption key K in a non-volatile memory which encrypts the confidential data and/or the data necessary for operation of the control unit B (channel 4) towards the receiver A. This key K is unique to the receiver A and written to the detachable security module C, making the information stream 4 unique to this system. The public broadcasting of this information 4 will no longer be of any use to other receivers as, in the case of the latter, since they are not in possession of the same key K, the information stream is completely incomprehensible. By means of the information 4, the control unit B can recover the descrambled video signal 2, this being processed and then transmitted in standard form (PAL, SECAM, NTSC) to the video monitor.

A variant of the invention employs encryption, of the same kind, of the information 3 sent to the detachable security module C either using the same key K or using a different key J, which is unique and specific to the system formed by the receiver A and the detachable security module C. Thus, any attempt to recover the key K from the information stream 4 is made much more difficult.

Some receivers are built around a chip which encompass all the decryption and management operations. This chip is represented with the circle B in the FIG. 1. The digital scrambled signal 1 enters into this chip and is outputted in analog format 2. This chip comprises a CPU, memories (RAM and ROM), a descrambler and a video decoder (MPEG). The CPU (central processing unit) manages all operations such as receiving and decrypting the data flow arriving from the security means C and furnishing the control words to the descrambler. The unique key K could be permanently programmed directly into the descrambler unit B.

In a first embodiment, the unique key is split into a first key which is permanently programmed in the descrambling unit (hardware key HK) and a second key which is stored in non volatile memory, i.e. EEPROM, FLASH, NVRAM (software key SK). These two keys form the unique pairing key K and are also stored in the security means (C).

In the asymmetric pair scheme, the first key HK is symmetric and the second key SK is asymmetric. Before sending the control words to the receiver, the security means C encrypt first with the symmetric key HK and then with the asymmetric key SK.

In another embodiment, both keys may be symmetric, asymmetric or a mix of these two encryption methods. This link between the hardware and software keys (HZ and SK) is established during final manufacture of the receiver A and only known by the operator. The pairing mechanism is done by the operator by storing the software key SK and the hardware key HK into the security means C. Thus the receiver A is paired with the security means which has received the same keys (HK and SK) and become inseparable. Even if the software key is modified or the chip containing the descrambler replaced, this pairing is lost and consequently the security means cannot provide usable scrambled control words.

Figure 2:
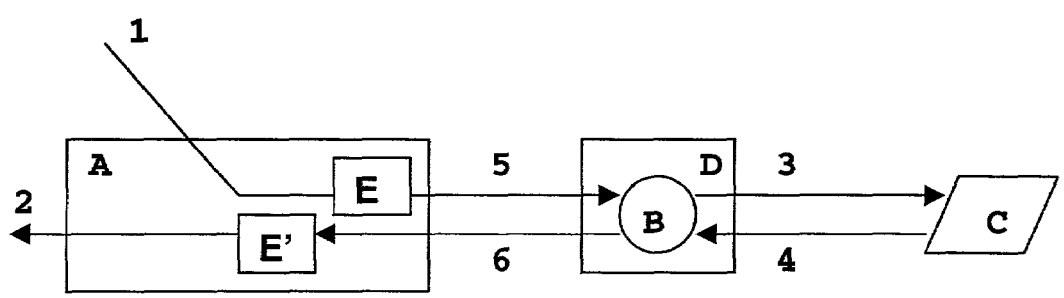
FIG. 2 illustrates a configuration employing a receiver, a detachable descrambling module and a detachable security module.

FIG. 2 illustrates a variant using a detachable descrambling module D which incorporates the control unit B. In this case, the scrambled video stream 1 is shaped by the receiver A and sent to the detachable descrambling module D. The mode of operation described in the case of FIG. 1 between the receiver A and the detachable security module C is this time applied to the conversation between the detachable descrambling module D and the detachable security module C. The key K is written in a secret part of the detachable descrambling module D instead of the receiver A. Thus, the information provided by the detachable security module C to the detachable descrambling module D is encrypted and therefore of no value to another detachable descrambling module D.

It may thus be seen that the information sent to the receiver A consists of a stream of descrambled video information 6 which can be readily exploited, for example for illicit copies. In one variant of the invention, the stream 6 is encrypted in the detachable descrambling module D before being sent to the receiver A for descrambling by the decrypting unit E'. This operation is carried out using a key K' specific only to the receiver A/detachable descrambling module D system. Consequently, the information stream 6 no longer has any meaning and can be understood only by the receiver A having the same key K'.

The receiver A may add, to the scrambled video stream 1, control information intended for the detachable descrambling module D. In order to prevent this information from being public and from opening a door to understanding the encryption mechanism, this information is encrypted by the encryption unit E in order to obtain a scrambled video stream 6 containing encrypted control information.

Figure 3:
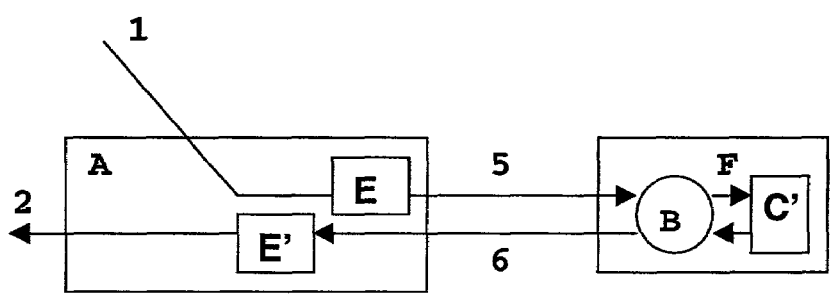
FIG. 3 illustrates a configuration employing a receiver and a detachable descrambling-security module.

FIG. 3 illustrates a variant of the invention in which the detachable security module is incorporated into a detachable descrambling-security module F. The function of this module is to descramble and to manage the authorization of the video signals received by the receiver A. According to the invention, this module includes a unique encryption key specific to the receiver A and written in this detachable descrambling-security module F. Likewise, the descrambled video stream 6 is encrypted by this key and sent in this form to the receiver A. The latter, by means of the decryption unit E' and by using the same unique key, will be able to recover the uncoded video signal.

By analogy with the operation described in relation to FIG. 2, the control information contained in the scrambled video stream 1 may be encrypted by means of a unique encryption key by the unit E before it is sent to the detachable descrambling-security module F.

In all the examples described in relation to FIGS. 1 to 3, the matching may be checked. In the case of FIG. 1, the receiver A writes a personal number, for example its serial number, in the detachable security module C. Thus, the receiver can at any instant verify that the detachable security module C is indeed that which is intended for it. In the context of the example illustrated in FIG. 2, the check may be made at two levels, namely a first level between the detachable descrambling module D and the detachable security module C and a second level between the detachable descrambling module D and the receiver A. This second level is particularly important if the unscrambled information 6 sent to the receiver A is encrypted.

In the solution shown in FIG. 3, the matching is checked between the receiver A and the detachable descrambling-security module F.

In one embodiment of the invention, the receiver A is an MPEG decoder using control words (information necessary for descrambling the signal) in order to descramble the video signal. These control words are provided by the detachable security module C. This module, for example a smart card, includes a non-volatile memory for storing them.

In one embodiment of the invention, the detachable descrambling module D is a PCMCIA-type card which includes an MPEG decoder (control unit B).

In one embodiment of the invention, the detachable descrambling-security module F is produced in the form of a smart card which incorporates an MPEG decoder and a security module C'.

In one embodiment of the invention, the unique encryption key K is common to a group of receivers. This possibility is advantageous, for example in a school having several receivers to which the same detachable security module is applied depending on the requirements. Likewise, several detachable security modules include the same encryption key in order to be able to be placed in any one of the receivers in the group. In this case, the matching check is carried out on a number which is no longer specific to one receiver but to a group of receivers. A combination may be produced with a number composed of two parts, one part defining the group and the other the receiver. The uniqueness of the personal number is respected, the matching conformity test then being carried out on more than just the group part of this number.

The invention claimed is:

1. A pay television reception system, comprising:
a plurality of receivers; and
a plurality of security devices, wherein
the plurality of receivers are configured to receive descrambling information from the plurality of security devices,
a security device of the plurality of security devices is coupled to a receiver of the plurality of receivers forming a receiver and security device pair,
a unique and constant encryption key is assigned to and stored in a non-volatile memory in the receiver and programmed into the security device such that the receiver and security device form a unique receiver and security device pair,
at least some information received from the security device is encrypted by the unique and constant encryption key, and
the receiver includes a personal number stored in the security device of the formed receiver and security device pair, such that the receiver is able to verify the conformity of the unique receiver and security device pair by verifying the personal number.

2. The pay television reception system of claim 1, wherein the unique and constant encryption key is assigned to and entered into the receiver subsequent to manufacture.

3. The pay television reception system of claim 1, wherein the unique and constant encryption key is assigned to and entered into the receiver during manufacture.

4. The pay television reception system of claim 1, wherein the unique and constant encryption key is permanently programmed into the receiver.

5. The pay television reception system of claim 1, wherein the unique and constant encryption key is stored in the receiver.

6. The pay television reception system of claim 1, wherein the unique and constant encryption key is permanently programmed into a descrambler chip of the receiver.

7. The pay television reception system of claim 1, wherein the unique and constant encryption key is in a non-volatile memory of the receiver.

8. The pay television reception system of claim 1, wherein the unique and constant encryption key is transmitted to the security device from a central management device.

9. The pay television reception system of claim 1, wherein the unique and constant encryption key is common to a group of receivers.

10. The pay television reception system of claim 1, wherein the at least some information sent from the receiver to the security device is encrypted by the unique and constant encryption key.

11. The pay television reception system of claim 1, wherein the personal number includes a part specific to a group of receivers and a part specific to one receiver, and the conformity of the matching is verified on the part specific to the group of receivers.

12. The pay television reception system of claim 1, wherein the receiver includes a control unit, and
the security device includes a detachable security module in which at least one of confidential information and information necessary for the operation of the control unit is stored.

13. The pay television reception system of claim 1, wherein the security device includes a detachable descrambling-security module including a control unit and a security unit, the control and security units being configured to descramble and authorize the video information.

14. The pay television reception system of claim 1, wherein the receiver includes a descrambling unit in which at least a part of the unique and constant encryption key is permanently programmed.

15. A pay television reception system comprising:
at least one receiver; and
at least one security device, wherein
the at least one receiver is configured to receive scrambled information and transfer the scrambled information to the at least one security device, the at least one receiver being further configured to receive descrambling information from the at least one security device,
the at least one security device includes a detachable security module and a detachable descrambling module including a control unit,
at least some of confidential information and information necessary for the operation of the control unit is encrypted before being sent to the detachable descrambling module by the detachable security module using a unique and constant encryption key for the set formed by the detachable descrambling module and the detachable security module, the unique and constant encryption key being assigned to and stored in a non volatile memory in the at least one receiver and in the detachable security module,
a security device of the at least one security device is coupled to a receiver of the at least one receiver forming a unique receiver and security device pair, and
the receiver of the at least one receiver includes a personal number stored in the security device of the formed receiver and security device pair, such that the receiver is able to verify the conformity of the unique receiver and security device pair by verifying the personal number.

16. A method of controlling the transmission of information in a pay television reception system between at least one receiver and at least one security device, comprising:
storing in a non volatile memory in the at least one receiver one unique and constant encryption key;
storing a personal number in a receiver of the at least one receiver and a security device of the at least one security device forming a unique receiver and security device pair;
sending the at least one unique and constant encryption key to the security device in a manner irrespective of the at least one receiver, wherein
information transmitted from the security module to the receiver is encrypted and decrypted using the at least one unique and constant encryption key for the set formed by the receiver and the security device, the information transmitted from the security device to the receiver including control information for descrambling a received audio video stream, and
the receiver is further configured to verify the conformity of the formed unique receiver and security device pair by verifying the personal number.

17. The method according to claim 16, wherein the unique and constant encryption key is assigned to and entered into the receiver subsequent to manufacture.

18. The method according to claim 16, wherein the unique and constant encryption key is assigned to and entered into the receiver during manufacture.

19. The method according to claim 16, wherein the unique and constant encryption key is programmed into the receiver.

20. The method according to claim 16, wherein the unique and constant encryption key is stored in the receiver.

21. The method according to claim 16, wherein the unique and constant encryption key is permanently programmed into a descrambler chip of the receiver.

22. The method according to claim 16, wherein the unique and constant encryption key is stored in a non-volatile memory of the receiver.

23. The method according to claim 16, wherein the unique and constant encryption key is transmitted to the security device from a central management device.

24. The method of claim 16, wherein a number personal to the receiver is written in the security device during an initialization operation and wherein the receiver is adapted to check conformity of the personal number written in the security device.

25. A detachable security module connected to a receiver as part of a pay television reception system, comprising:
at least one non-volatile memory, configured to store at least one of confidential data and data necessary for operating a descrambling system;
a transceiver configured to transmit descrambling information to and receive information from the receiver locally coupled to the security module; and
an encryptor configured to encrypt a transmission, wherein the at least one non-volatile memory includes at least one encryption key which acts on the encryptor, said encryption key is unique and constant for the set formed by the receiver and the detachable security module and stored in a non volatile memory in the at least one receiver on one side and in the detachable security module on the other side, and the receiver includes a personal number stored in the security module of the formed receiver and detachable security module pair, such that the receiver is able to verify the conformity of the unique receiver and detachable security module pair by verifying the personal number.

26. A detachable descrambling module configured to be part of a pay television reception system, the detachable descrambling module comprising:

a control unit;

a first transceiver configured to transmit and receive information to and from a detachable security module, the information received from the detachable security module including descrambling information;

a second transceiver configured to transmit and receive from at least one receiver coupled to the detachable security module;

a non-volatile memory; and a decryptor configured to decrypt, wherein the non-volatile memory includes at least one encryption key configured to act on a first encryptor configured to encrypt and to decrypt a transmission of the first transceiver, said encryption key is unique and constant for the set formed by the detachable security module and the detachable descrambling module, the key being programmed in the at least one receiver, and a receiver of the at least one receiver includes a personal number stored in the security module of the formed receiver and detachable security module pair, such that the receiver is able to verify the conformity of the unique receiver and detachable security module pair by verifying the personal number.

27. The detachable descrambling module of claim 26, further comprising:

a second encryptor configured to encrypt and to decrypt, wherein the non-volatile memory includes at least one encryption key which acts on the second encryptor intended for encrypting the transmission of the second transceiver, said encryption key being unique and constant for the set formed by the at least one receiver and the detachable descrambling module.

28. The method of claim 26, wherein a number personal to the receiver is written in the security device during an initialization operation and wherein the receiver is adapted to check conformity of the personal number written in the security device.

29. The pay television descrambling receiver according to claim 27, further comprising:

a descrambling unit, in which at least a part of the encryption key is permanently and irretrievably programmed.

30. A pay television descrambling receiver, comprising:

a transceiver configured to transmit and receive information to and from a security device coupled to the pay television descrambling receiver, the information received from the security device including descrambling information;

a non-volatile memory;

an encryptor configured to encrypt transmissions from and decrypt transmissions to the security device, the non-volatile memory programmed with at least one encryption key configured to act on the encryptor said at least one encryption key is unique and constant for the set formed by the security device and the pay television descrambling receiver, and the pay television descrambling receiver includes a personal number stored in the security device of the set formed by the pay television descrambling receiver security device pair, such that the receiver is able to verify the conformity of the unique pay television receiver and security device pair by verifying the personal number.

31. The pay television descrambling receiver according to claim 30, wherein the encryption key is assigned to and entered into the pay television descrambling receiver subsequent to manufacture.

32. The pay television descrambling receiver according to claim 30, wherein the encryption key is assigned to and entered into the pay television descrambling receiver during manufacture.

33. The method of claim 30, wherein a number personal to the receiver is written in the security device during an initialization operation and wherein the receiver is adapted to check conformity of the personal number written in the security device.

34. A pay television descrambling receiver, comprising:

a chip, the chip including, a transceiver configured to transmit and receive information from a security device coupled to the pay television descrambling receiver, the information received from the security device including scrambled control words; and an encryptor configured to encrypt transmissions from and decrypt transmissions to the security device, wherein at least one encryption key, configured to act on the encryptor, is programmed into the chip, said at least one encryption key is unique and constant for the set formed by the security device and the pay television descrambling receiver, and the pay television descrambling receiver includes a personal number stored in the security device of the set formed by the security device and the pay television descrambling receiver pair, such that the receiver is able to verify the conformity of the unique receiver and security device pair by verifying the personal number.

35. The pay television descrambling receiver of claim 34, wherein the key is assigned to and entered into the pay television descrambling receiver subsequent to manufacture.

36. The pay television descrambling receiver of claim 34, wherein the key is assigned to and entered into the pay television descrambling receiver during manufacture.

37. The pay television descrambling receiver of claim 34, wherein the key is permanently programmed into the pay television descrambling receiver.

38. The method of claim 34, wherein a number personal to the receiver is written in the security device during an initialization operation and wherein the receiver is adapted to check conformity of the personal number written in the security device.

* * * * *